United States Patent
Verrilli et al.

(10) Patent No.: US 10,055,158 B2
(45) Date of Patent: Aug. 21, 2018

(54) PROVIDING FLEXIBLE MANAGEMENT OF HETEROGENEOUS MEMORY SYSTEMS USING SPATIAL QUALITY OF SERVICE (QOS) TAGGING IN PROCESSOR-BASED SYSTEMS

(71) Applicant: QUALCOMM Incorporated, San Diego, CA (US)

(72) Inventors: Colin Beaton Verrilli, Apex, NC (US); Carl Alan Waldspurger, Palo Alto, CA (US); Natarajan Vaidhyanathan, Carrboro, NC (US); Mattheus Cornelis Antonius Adrianus Heddes, Raleigh, NC (US); Koustav Bhattacharya, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 15/272,951

(22) Filed: Sep. 22, 2016

(65) Prior Publication Data

US 2018/0081579 A1 Mar. 22, 2018

(51) Int. Cl.
*G06F 12/0891* (2016.01)
*G06F 3/06* (2006.01)
(Continued)

(52) U.S. Cl.
CPC .......... *G06F 3/0629* (2013.01); *G06F 3/0604* (2013.01); *G06F 3/0685* (2013.01);
(Continued)

(58) Field of Classification Search
CPC .... G06F 3/0629; G06F 3/0604; G06F 3/0685; G06F 12/0891; G06F 2212/20; G06F 2212/60; G06F 12/0802; G06F 13/1668
See application file for complete search history.

(56) References Cited

U.S. PATENT DOCUMENTS 6,530,007 B2  3/2003  Olarig et al.
7,646,636 B2  1/2010  Kim
(Continued)

FOREIGN PATENT DOCUMENTS

WO  2015101827 A1  7/2015
WO  2016085641 A1  6/2016

OTHER PUBLICATIONS

Iyer, Ravi, "CQoS: A Framework for Enabling QoS in Shared Caches of CMP Platforms," 2004 International Conference on Supercomputing (ICS), Jun. 26, 2004, ACM, pp. 257-266.
(Continued)

*Primary Examiner* — Yaima Rigol
(74) *Attorney, Agent, or Firm* — W&T/Qualcomm

(57) ABSTRACT

Providing flexible management of heterogeneous memory systems using spatial Quality of Service (QoS) tagging in processor-based systems is disclosed. In one aspect, a heterogeneous memory system of a processor-based system includes a first memory and a second memory. The heterogeneous memory system is divided into a plurality of memory regions, each associated with a QoS identifier (QoSID), which may be set and updated by software. A memory controller of the heterogeneous memory system provides a QoS policy table, which operates to associate each QoSID with a QoS policy state, and which also may be software-configurable. Upon receiving a memory access request including a memory address of a memory region, the memory controller identifies a software-configurable QoSID associated with the memory address, and associates the QoSID with a QoS policy state using the QoS policy table. The memory controller then applies the QoS policy state to perform the memory access operation.

25 Claims, 6 Drawing Sheets

(51) Int. Cl.
*G06F 12/0802* (2016.01)
*G06F 13/16* (2006.01)

(52) U.S. Cl.
CPC ...... *G06F 12/0802* (2013.01); *G06F 12/0891* (2013.01); *G06F 13/1668* (2013.01); *G06F 2212/20* (2013.01); *G06F 2212/60* (2013.01)

(56) References Cited

U.S. PATENT DOCUMENTS

| | | |
|---|---|---|
| 8,751,746 B2 | 6/2014 | Lilly |
| 2003/0135609 A1* | 7/2003 | Carlson ................ G06F 9/5011 709/224 |
| 2008/0270483 A1* | 10/2008 | Kumar .................... G06F 3/061 |
| 2012/0213114 A1* | 8/2012 | Chen ..................... H04L 1/0002 370/252 |
| 2013/0046934 A1 | 2/2013 | Nychka et al. |
| 2014/0146672 A1* | 5/2014 | Arteaga ................. H04L 47/14 370/231 |
| 2014/0181428 A1* | 6/2014 | Hsu ........................ G06F 12/00 711/154 |
| 2014/0297941 A1* | 10/2014 | Rajani ................... G06F 3/0644 711/114 |
| 2016/0054922 A1* | 2/2016 | Awasthi ................ G06F 3/0631 711/103 |
| 2016/0054933 A1 | 2/2016 | Haghighi et al. |

OTHER PUBLICATIONS

International Search Report and Written Opinion for PCT/US2017/048561, dated Oct. 11, 2017, 15 pages.

* cited by examiner

PROVIDING FLEXIBLE MANAGEMENT OF HETEROGENEOUS MEMORY SYSTEMS USING SPATIAL QUALITY OF SERVICE (QOS) TAGGING IN PROCESSOR-BASED SYSTEMS

BACKGROUND

I. Field of the Disclosure

The technology of the disclosure relates generally to memory management, and, in particular, to managing heterogeneous memory systems.

II. Background

A heterogeneous memory system is a memory system of a processor-based system that incorporates two or more different types of memory having comparatively different performance characteristics (e.g., capacity, bandwidth, access latency, power consumption, and/or the like). As non-limiting examples, a heterogeneous memory system may include a high-bandwidth memory (HBM) that provides atypically wide communication lanes, along with a dynamic random access memory (DRAM) that provides conventionally sized communication lanes. Other aspects of a heterogeneous memory system may include DRAM and phase-change memory, DRAM and a Level 3 (L3) cache on a processor die, and/or other combinations of different memory types known in the art.

Conventional heterogeneous memory systems may present limited options with respect to memory management. In some aspects, memory of one type (e.g., HBM) may be configured to act as a cache for an entire memory address space of the heterogeneous memory system. Such aspects are relatively simple and easy to deploy, and may be transparently managed by hardware. However, because all decisions regarding the placement of data or allocation of memory are handled by hardware, no software input or influence on data placement or allocation memory is utilized.

Alternatively, the heterogeneous memory system may employ disjoint address regions, and may allow dynamic memory management and reallocation operations to be performed by software instead of hardware. This approach is often preferable to exclusive hardware control, as software may have access to data (e.g., workload, program semantics, and/or relative priorities) that is relevant to memory allocation, but that cannot be accessed or transparently inferred by hardware. However, such dynamic memory management may require extremely complex data migration decisions, and software capable of managing such decisions, along with other necessary processor- and time-expensive operations, which may be difficult to develop and maintain. Thus, a memory management mechanism that provides hardware support and software control for flexible management of heterogeneous memory systems is desirable.

SUMMARY OF THE DISCLOSURE

Aspects disclosed in the detailed description include providing flexible management of heterogeneous memory systems using spatial Quality of Service (QoS) tagging in processor-based systems. In one aspect, a heterogeneous memory system of a processor-based system includes a first memory (e.g., a high-bandwidth memory (HBM), as a non-limiting example) and a second memory (e.g., a dynamic random access memory (DRAM), as a non-limiting example). The heterogeneous memory system is divided into a plurality of memory regions, such as memory pages each having a size of four (4) kilobytes, as a non-limiting example. The heterogeneous memory system is configured to employ what is referred to herein as "spatial Quality of Service (QoS) tagging," in which each of the plurality of memory regions is associated with a QoS identifier (QoSID), which may be set and updated by software. A memory controller of the heterogeneous memory system provides a QoS policy table, which operates to map each QoSID to a QoS policy state (such as a quota, a priority, a proportional-share weight, and/or a probability, as non-limiting examples), and which also may be software-configurable. Upon receiving a memory access request including a memory address of a memory region, the memory controller identifies a software-configurable QoSID associated with the memory address, and associates the QoSID with a QoS policy state using the QoS policy table. The memory controller then applies the QoS policy state to perform a memory access operation. For instance, in aspects in which the first memory is configured as a transparent cache for the second memory, the memory controller may apply the QoS policy state in performing a cache eviction from the first memory or a cache fill of the first memory. In this manner, a software process may indirectly influence memory allocation and data placement by specifying a QoSID for each of the plurality of memory regions, and by associating the QoSID with a QoS policy state that is enforced by the memory controller.

In another aspect, a memory controller for providing flexible management of a heterogeneous memory system of a processor-based system is provided. The memory controller communicatively is coupled to a first memory and a second memory having different performance characteristics. The memory controller includes a software-configurable QoS policy table providing a plurality of QoS policy entries. Each QoS policy entry includes a QoS policy state and is associated with a QoSID of one or more QoSIDs each associated with one of a plurality of memory regions. The plurality of memory regions reside within the first memory, the second memory, or both. The memory controller is configured to receive a memory access request comprising a memory address corresponding to a memory region of the plurality of memory regions. The memory controller is further configured to identify a software-configurable QoSID associated with the memory address. The memory controller is also configured to associate, using the QoS policy table, the QoSID associated with the memory address with a QoS policy state. The memory controller is additionally configured to apply the QoS policy state to perform a memory access operation on one of the first memory and the second memory.

In another aspect, a memory controller for providing flexible management of a heterogeneous memory system of a processor-based system is provided. The memory controller comprises a means for receiving a memory access request comprising a memory address corresponding to a memory region of a plurality of memory regions of one or more of a first memory and a second memory having different performance characteristics. The memory controller further comprises a means for identifying a software-configurable QoSID associated with the memory address. The memory controller also comprises a means for associating, using a software-configurable QoS policy table, the QoSID associated with the memory address with a QoS policy state. The memory controller further comprises a means for applying the QoS policy state to perform a memory access operation on one of the first memory and the second memory.

In another aspect, a method for providing flexible management of a heterogeneous memory system of a processor-based system is provided. The method comprises receiving, by a memory controller, a memory access request comprising a memory address corresponding to a memory region of a plurality of memory regions of one or more of a first memory and a second memory having different performance characteristics. The method further comprises identifying a software-configurable QoSID of a plurality of QoSIDs, wherein the QoSID is associated with the memory address. The method also comprises associating, using a software-configurable QoS policy table of the memory controller, the QoSID associated with the memory address with a QoS policy state. The method additionally comprises applying the QoS policy state to perform a memory access operation on one of the first memory and the second memory.

DETAILED DESCRIPTION

Figure 1:
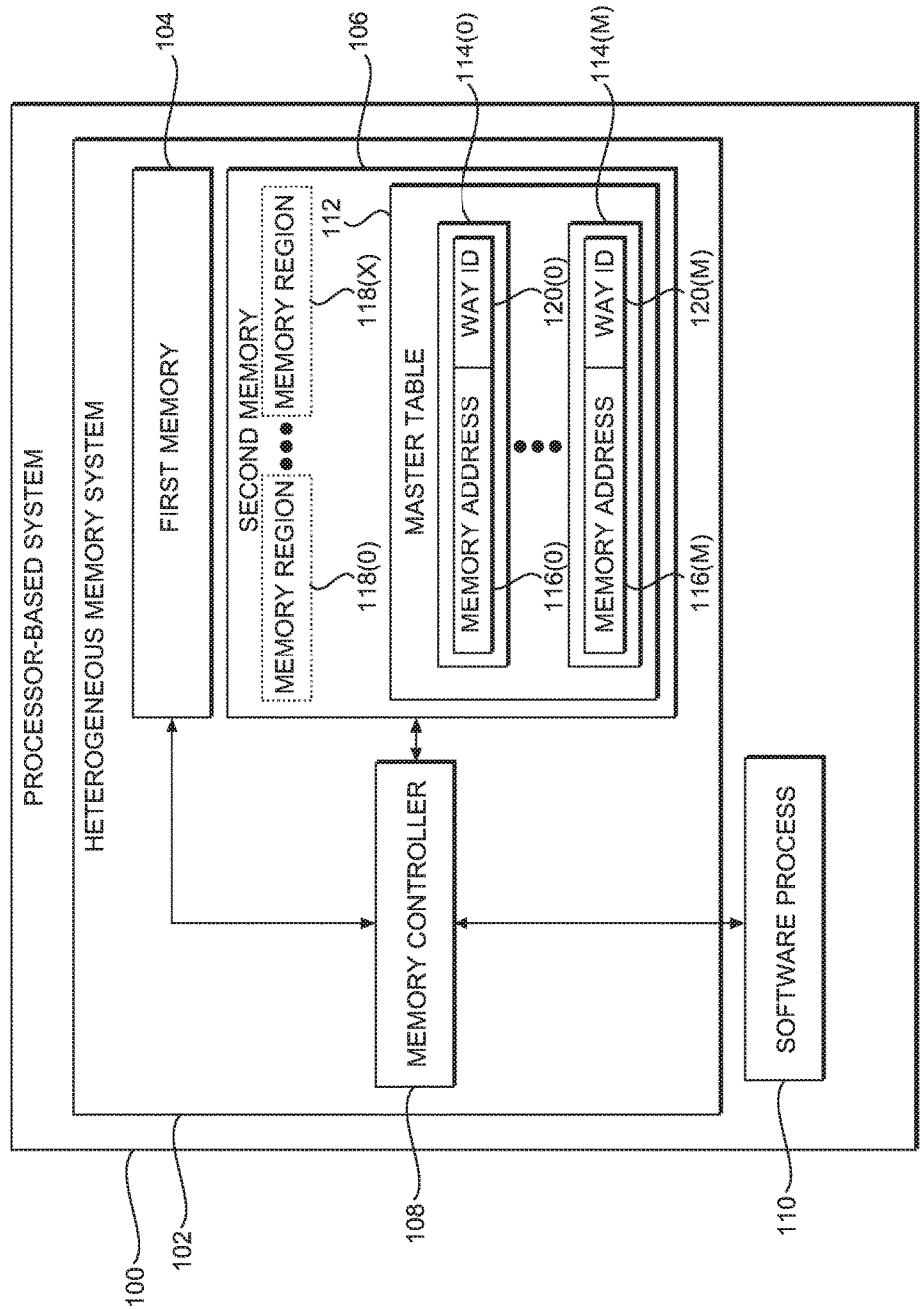
FIG. 1 is a block diagram of an exemplary processor-based system that provides a heterogeneous memory system.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include providing flexible management of heterogeneous memory systems using spatial Quality of Service (QoS) tagging in processor-based systems. Before describing a memory controller configured to flexibly manage memory using spatial QoS tagging, exemplary elements and operation of a heterogeneous memory system of a processor-based system are first described.

In this regard, FIG. 1 illustrates an exemplary processor-based system 100 that provides a heterogeneous memory system 102. In some aspects, the processor-based system 100 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages. It is to be understood that the processor-based system 100 may include additional elements not illustrated herein for the sake of clarity.

As seen in FIG. 1, the heterogeneous memory system 102 includes a first memory 104 and a second memory 106. According to some aspects, the first memory 104 may include a high-bandwidth memory (HBM), and the second memory 106 may include a dynamic random access memory (DRAM), as non-limiting examples. Access to the first memory 104 and the second memory 106 is managed by a memory controller 108, which may receive memory access requests from a software process 110 comprising instructions being executed by the processor-based system 100. It is to be understood that the software process 110 may execute in parallel with one or more other software processes, and may comprise an application, a hypervisor, a virtual machine, an operating system, and/or a container, as non-limiting examples.

Some aspects may provide that the memory controller 108 may be configured to operate the first memory 104 as a transparent cache of the second memory 106. In such aspects, the second memory 106 may be used to store a master table 112. The master table 112 contains a plurality of master table entries 114(0)-114(M), each of which associates a range of one or more memory addresses 116(0)-116(M) of a memory region 118(0)-118(X) of the second memory 106 with a cache way identifier ("WAY ID") 120(0)-120(M). Thus, to determine in which cache way of the first memory 104 a given memory region 118(0)-118(X) of the second memory 106 may be stored, the memory controller 108 may perform a lookup operation on the master table 112. While the master table 112 is illustrated as part of the second memory 106 in FIG. 1, it is to be understood that the master table 112 may be stored as part of other memory elements that are accessible by the memory controller 108 including the first memory 104 for example. In some aspects, the memory regions 118(0)-118(X) each may be a memory page (e.g., a four (4) kilobyte (kB) memory page), while some aspects may provide that each of the memory regions 118(0)-118(X) is a larger or smaller subdivision of the second memory 106. Some aspects may provide that the memory regions 118(0)-118(X) may be of non-uniform sizes.

Figure 2:
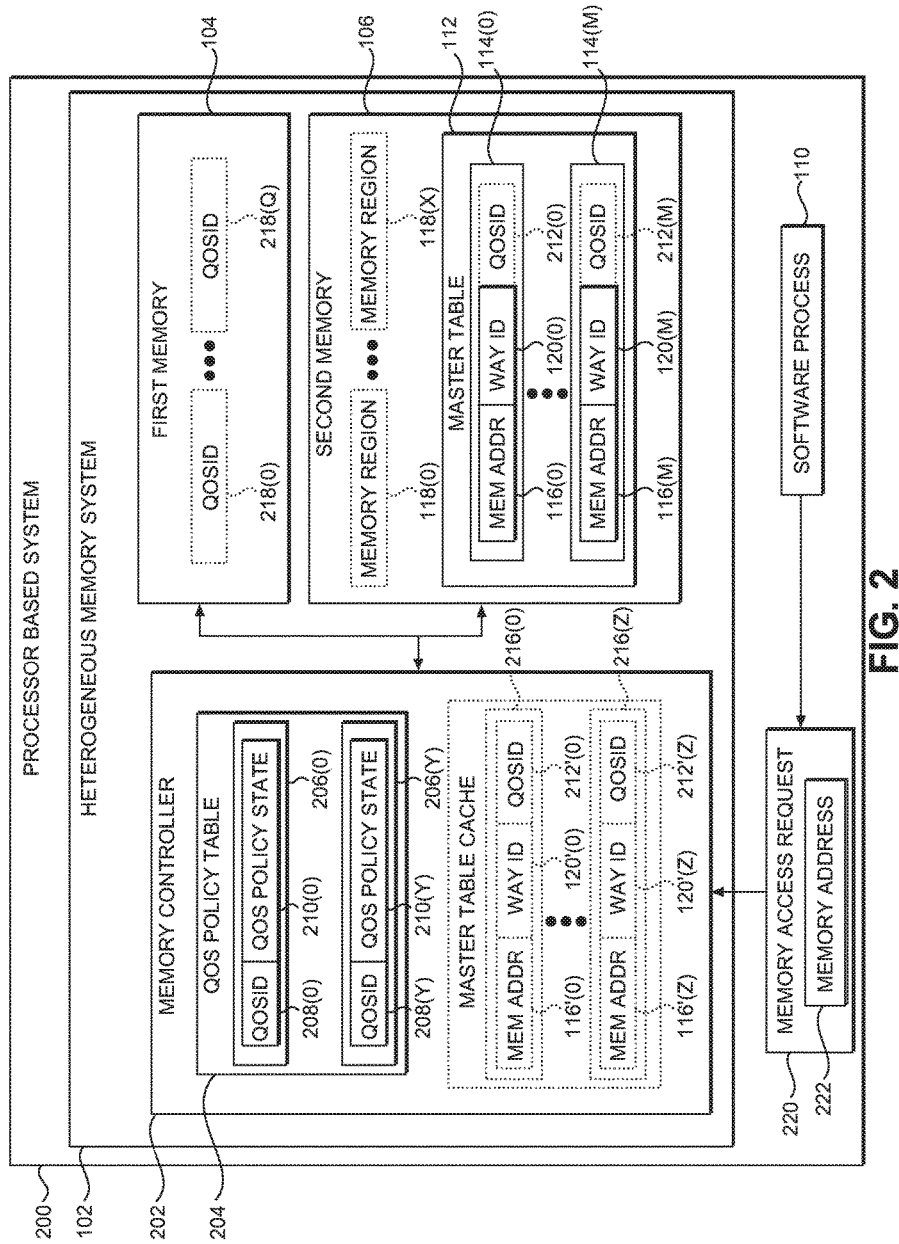
FIG. 2 is a block diagram of a processor-based system including a memory controller for providing flexible management of a heterogeneous memory system using spatial Quality of Service (QoS) tagging.

FIG. 2 illustrates a processor-based system 200 that provides a memory controller 202 for performing flexible management of the heterogeneous memory system 102 of FIG. 1 using spatial QoS tagging. In the example of FIG. 2, the memory controller 202 includes a QoS policy table 204 that contains a plurality of QoS policy entries 206(0)-206(Y). Each of the plurality of QoS policy entries 206(0)-206(Y) associates a QoSID 208(0)-208(Y) with a corresponding QoS policy state 210(0)-210(Y). In some aspects, the QoS policy table 204 may not explicitly store a value for each QoSID 208(0)-208(Y) as shown in FIG. 2, but rather may implicitly define each of the QoSIDs 208(0)-208(Y) as the row index in the QoS policy table 204 of the corresponding QoS policy state 210(0)-210(Y). The QoS policy states 210(0)-210(Y) may each represent any applicable QoS attribute (such as a quota, a priority, a proportional-share weight, and/or a probability, as non-limiting examples) that may be enforced by the memory controller 202. The QoS policy table 204 may be updated by the software process 110. Accordingly, the software process 110 may specify a QoS attribute for each QoS policy state 210(0)-210(Y) associated with each QoSID 208(0)-208(Y).

In some aspects, the master table 112 may be expanded to include QoSIDs 212(0)-212(M) as part of the master table entries 114(0)-114(M). In this manner, the master table entries 114(0)-114(M) may be used to identify the QoSIDs 212(0)-212(M) that are associated with a range of one or more of the memory addresses 116(0)-116(M) and/or with an entire memory region 118(0)-118(X) of the second memory 106. In some aspects, the master table 112 may be organized as two (2) separate structures having different addressing granularities (e.g., one may provide memory address-to-way mapping to provide cache line granularity, while the other may provide memory address-to-QoSID mapping to provide coarser page granularity). Alternatively, some aspects may provide a single master table 112 in which the contents of the two (2) separate structures are combined or interleaved. According to some aspects, the master table 112 may not store the memory address 116 expressly, but rather may use high order bits of the memory address 116 as an index into the master table 112.

The QoSIDs 212(0)-212(M) of the master table 112 may be updated by the software process 110, thus enabling the software process 110 to selectively set the values of the QoSIDs 212(0)-212(M) assigned to the memory regions 118(0)-118(X). In some aspects, one of the QoSIDs 208(0)-208(Y) may be designated as specifying a "default" QoSID 208(0)-208(Y) that is used to determine a QoS policy state 210(0)-210(Y) to be applied to memory regions 118(0)-118(X) that are not explicitly assigned to a QoSID 208(0)-208(Y). Some aspects may provide that the QoSIDs 208(0)-208(Y) may be associated with memory regions 118(0)-118(X) of different sizes representing multiple granularities, such that the QoSID 208(0)-208(Y) associated with the most specific granularity is applied. For example, a first QoSID 208(0)-208(Y) may be associated with a larger two (2) megabyte memory region 118(0)-118(X), while a second QoSID 208(0)-208(Y) may be associated with a smaller four (4) kilobyte memory region 118(0)-118(X) within the larger memory region 118(0)-118(X). In this case, the first QoSID 208(0)-208(Y) would be applied to the entire two (2) megabyte memory region 118(0)-118(X) except for the smaller four (4) kilobyte memory region 118(0)-118(X), which would fall under the second QoSID 208(0)-208(Y).

Some aspects may provide that the memory controller 202 also includes a master table cache 214 for caching recently read master table entries 114(0)-114(M) from the master table 112. The master table cache 214 provides a plurality of master table cache entries 216(0)-216(Z) storing cached memory addresses 116'(0)-116'(Z), cached way identifiers ("WAY IDs") 120'(0)-120'(Z), and cached QoSIDs 212'(0)-212'(Z). When attempting to identify a QoSID associated with a memory address range and/or a memory region of the memory regions 118(0)-118(X), the memory controller 202 may access the master table cache 214 before performing a lookup in the master table 112 in the second memory 106. If the master table cache 214 produces a cache hit, the memory controller 202 may read a cached QoSID 212'(0)-212'(Z) from the master table cache 214, which reduces memory access latency and conserves memory bandwidth by avoiding an unnecessary read to the master table 112. According to some aspects in which the first memory 104 is used as a transparent cache for the second memory 106, accesses to the master table 112 may also be avoided by storing QoSIDs 218(0)-218(Q) within the first memory 104 (e.g., along with the cache tags (not shown) for each cache line (not shown)). In such aspects, a subset of the cache line granularity data from the master table 112 may be incorporated into the cache provided by the first memory 104.

In exemplary operation, the memory controller 202 may receive a memory access request 220, including a memory address 222, from the software process 110. The memory controller 202 identifies a QoSID (e.g., the QoSID 212(0)) corresponding to the memory address 222 (e.g., by performing a lookup into the master table 112 and/or into the master table cache 214 using the memory address 222 or high order bits of the memory address 222). Once the QoSID 212(0) is identified, the memory controller 202 uses the QoS policy table 204 to associate the QoSID 212(0) to a QoS policy state (e.g., the QoS policy state 210(0)). The memory controller 202 then applies the QoS policy state 210(0) in carrying out the memory access request 220. For instance, in aspects in which the first memory 104 is configured to operate as a transparent cache for the second memory 106, the memory access request 220 may indicate a memory read operation or a memory write operation on the memory address 222 in the second memory 106. Upon receiving the memory access request 220, the memory controller 202 identifies the QoSID 212(0) corresponding to the memory address 222, and determines the QoS policy state 210(0) that applies to that region of the second memory 106 (e.g., how much of the cache in the first memory 104 may be occupied, etc.) The memory controller 202 may perform cache eviction operations or cache fill operations on the first memory 104 in accordance with the QoS policy state 210(0).

In this manner, the memory controller 202 provides the benefit of transparent addressing and transparent caching, since the software process 110 does not have to make decisions regarding memory allocation or relocation. However, the software process 110 is still able to influence data placement and allocation by updating the QoSIDs 212(0)-212(M) and/or the QoS policy table 204. This aspect provides flexible support for both unmanaged caches and software-managed partitions. For example, when using the first memory 104 as a cache, the software process 110 may implement a quota-based memory management scheme, whereby a given one of the memory regions 118(0)-118(X) of the second memory 106 (e.g., the memory region 118(0)) is locked in the first memory 104 by assigning the QoS policy state 210(0) to specify a quota larger than the size of the memory regions 118(0)-118(X). Consequently, data for the memory region 118(0) will never be evicted from the first memory 104 because the quota will never be met. Similarly, the software process 110 may implement a cache bypass by assigning the QoS policy state 210(0) to specify a quota of zero (0). The software process 110 could also implement a partial cache scheme by assigning the QoS policy state 210(0) to specify a quota less than the size of the first memory 104. Note that a quota assigned by the QoS policy state 210(0) would apply to the aggregate size of all memory regions 118(0)-118(X) of the second memory 106 that are associated with the corresponding QoSID 212(0)-212(M). For example, assume that the QoSID 212(0) is associated with four (4) memory regions 118(0)-118(3) of the second memory 106, with each of the memory regions 118(0)-118(3) being four (4) kilobytes in size. As long as the quota specified by the QoS policy state 210(0) associated with the QoSID 212(0) is at least 16 kilobytes, the memory regions 118(0)-118(3) will remain locked in the first memory 104.

When applying the QoS policy states 210(0)-210(Y) for aspects in which the first memory 104 is configured to operate as a transparent cache for the second memory 106, the memory controller 202 may employ different strategies for allocation of the first memory 104. For example, when determining cache lines to evict from the first memory 104, the memory controller 202 may randomly sample a number of cache lines, and select a cache line associated with a QoSID that is most over quota as the eviction victim. Alternately, if the cache line to be written to the first memory 104 is the most over quota, the memory controller 202 may opt to bypass the first memory 104 entirely, or evict another cache line having the same QoSID. When performing a cache fill, the memory controller 202 may base the cache fill operation on a quota or a probability indicated by the QoS policy state associated with the QoSID of the new data.

Finally, in some aspects, the memory controller 202 may improve aggregate bandwidth for the first memory 104 and the second memory 106 by intentionally leaving some memory capacity of the first memory 104 unused. This may be accomplished by designating a quota for invalid lines in the first memory 104, which allows a specified number of lines to remain idle in the first memory 104.

Figure 3A:
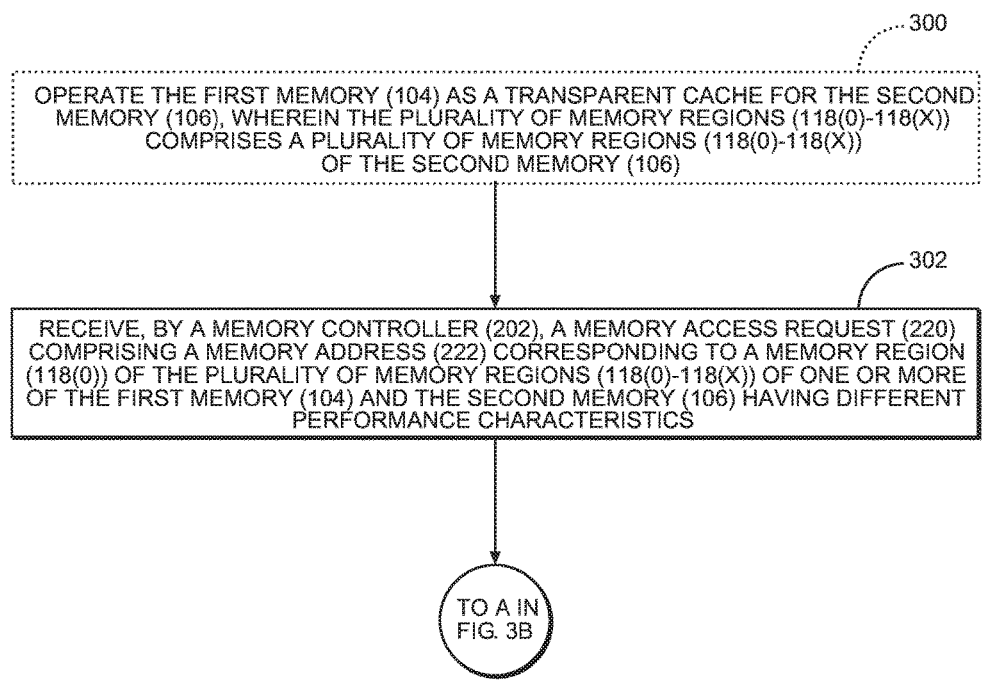
FIGS. 3A-3C are flowcharts illustrating exemplary operations of the memory controller of FIG. 2 for using spatial QoS tagging to flexibly manage a heterogeneous memory system.
Figure 3B:
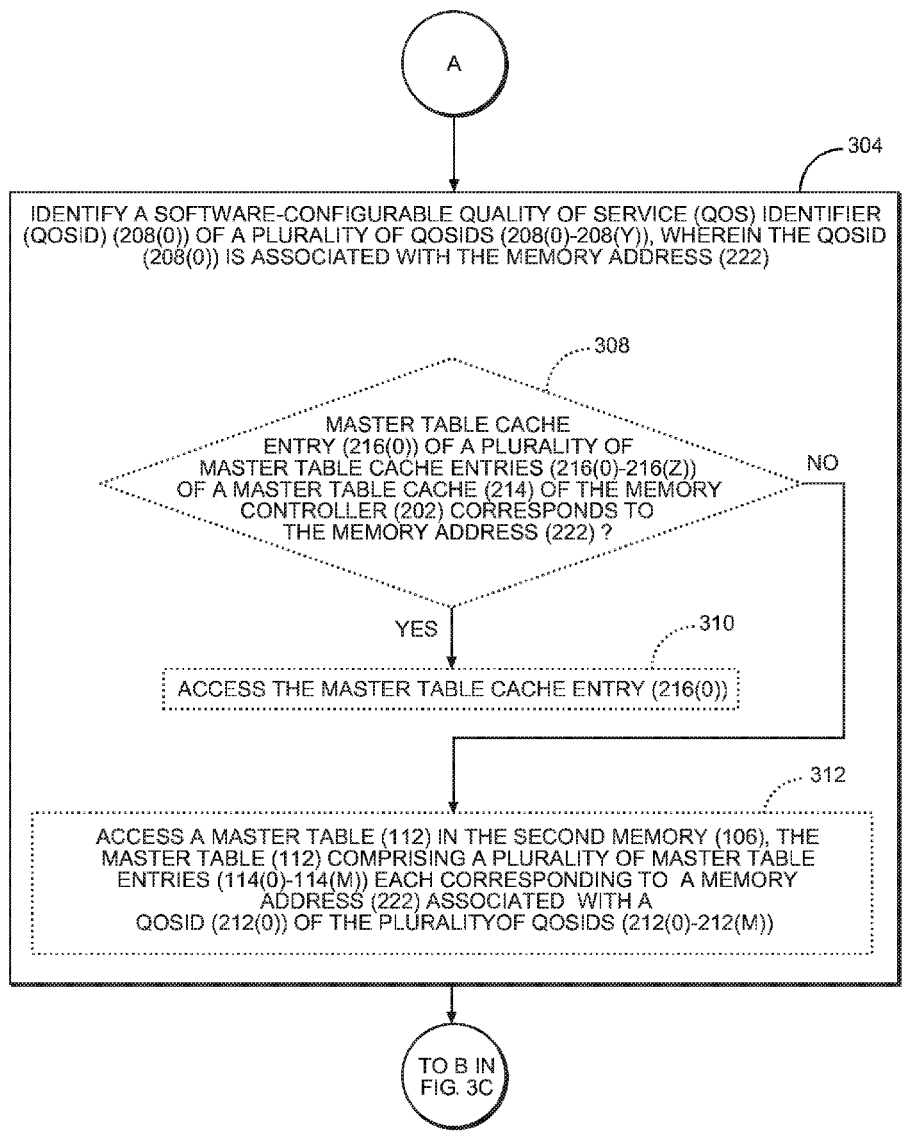
Figure 3C:
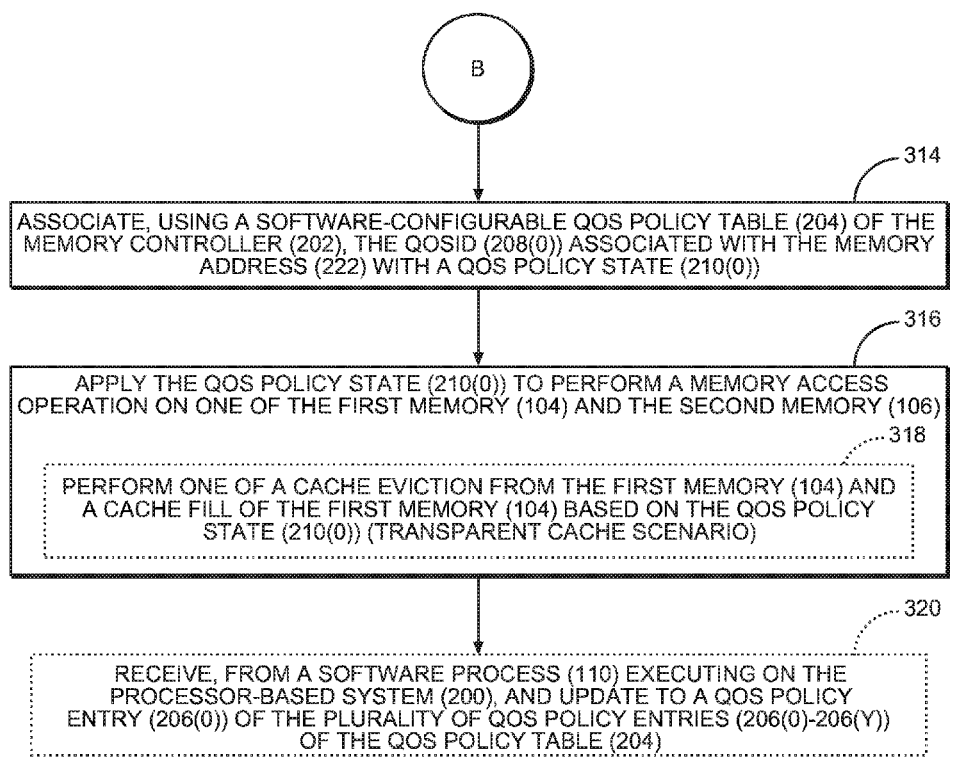

To illustrate exemplary operations of the memory controller 202 of FIG. 2 for flexibly managing the heterogeneous memory system 102, FIGS. 3A-3C are provided. For the sake of clarity, elements of FIG. 2 are referenced in describing FIGS. 3A-3C. In FIG. 3A, operations may begin in different ways depending on the particular implementation of the heterogeneous memory system 102. In some aspects, the memory controller 202 may operate the first memory 104 as a transparent cache for the second memory 106, wherein the plurality of memory regions 118(0)-118(X) comprises a plurality of memory regions 118(0)-118(X) of the second memory 106 (block 300). The memory controller 202 receives a memory access request 220 comprising a memory address 222 corresponding to a memory region 118(0) of the plurality of memory regions 118(0)-118(X) of one or more of the first memory 104 and the second memory 106 having different performance characteristics (block 302). In this regard, the memory controller 202 may be referred to herein as "a means for receiving a memory access request comprising a memory address corresponding to a memory region of a plurality of memory regions of one or more of a first memory and a second memory having different performance characteristics." Processing then resumes at block 304 in FIG. 3B.

Referring now to FIG. 3B, the memory controller 202 next identifies a software-configurable QoSID 208(0) of the plurality of QoSIDS 208(0)-208(Y), wherein the QoSID 208(0) is associated with the memory address 222 (block 304). Accordingly, the memory controller 202 may be referred to herein as "a means for identifying a software-configurable QoSID associated with the memory address." Some aspects, such as those in which the first memory 104 is configured to operate as a transparent cache for the second memory 106, may provide that operations of block 304 for identifying the QoSID 208(0) associated with the memory address 222 may include determining whether a master table cache entry 216(0) of a plurality of master table cache entries 216(0)-216(Z) of a master table cache 214 of the memory controller 202 corresponds to the memory address 222 (block 308). If so, the memory controller 202 may access the master table cache entry 216(0) (block 310). However, if no master table cache entry 216(0) of the plurality of master table cache entries 216(0)-216(Z) corresponds to the memory address 222, the memory controller 202 may access the master table 112 in the second memory 106, the master table 112 including a plurality of master table entries 114(0)-114(M) each corresponding to the memory address 222 associated with a QoSID 212(0) of the plurality of QoSIDs 212(0)-212(M) (block 312). After identifying the QoSID 212(0) associated with the memory address 222, processing resumes at block 314 of FIG. 3C.

Turning now to FIG. 3C, the memory controller 202 associates, using the software-configurable QoS policy table 204 of the memory controller 202, the QoSID 208(0) associated with the memory address 222 with a QoS policy state 210(0) (block 314). The memory controller 202 thus may be referred to herein as "a means for associating, using a software-configurable QoS policy table, the QoSID associated with the memory address with a QoS policy state." The memory controller 202 then applies the QoS policy state 210(0) to perform a memory access operation on one of the first memory 104 and the second memory 106 (block 316). In this regard, the memory controller 202 may be referred to herein as "a means for applying the QoS policy state to perform a memory access operation on one of the first memory and the second memory." In some aspects, such as those in which the first memory 104 is configured to operate as a transparent cache for the second memory 106, operations of block 316 for applying the QoS policy state 210(0) to perform a memory access operation may comprise performing one of a cache eviction from the first memory 104 and a cache fill of the first memory 104 based on the QoS policy state 210(0) (block 318). Some aspects may also provide that the memory controller 202 may receive, from a software process 110 executing on the processor-based system 200, an update to a QoS policy entry 206(0) of the plurality of QoS policy entries 206(0)-206(Y) of the QoS policy table 204 (block 320).

Providing flexible management of heterogeneous memory systems using spatial Quality of Service (QoS) tagging in processor-based systems according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 4:
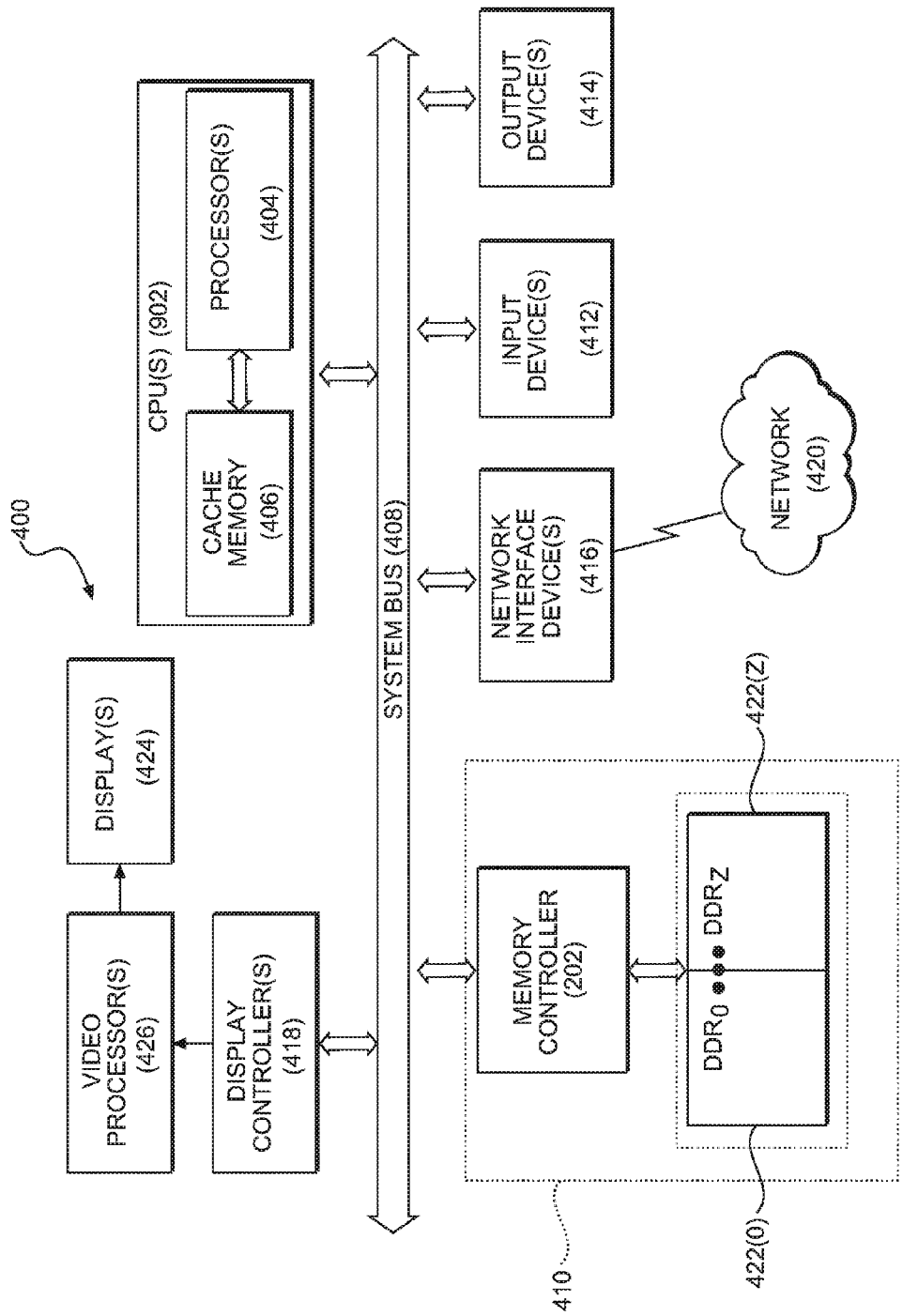
FIG. 4 is a block diagram of an exemplary processor-based system that can include the heterogeneous memory system and the memory controller of FIG. 2.

In this regard, FIG. 4 illustrates an example of a processor-based system 400 that may correspond to the processor-based system 200 of FIG. 2, and that can employ the memory controller 202 illustrated in FIG. 2. In this example, the processor-based system 400 includes one or more central processing units (CPUs) 402, each including one or more processors 404. The CPU(s) 402 may be a master device. The CPU(s) 402 may have cache memory 406 coupled to the processor(s) 404 for rapid access to temporarily stored data. The CPU(s) 402 is coupled to a system bus 408 and can intercouple master and slave devices included in the processor-based system 400. As is well known, the CPU(s) 402 communicates with these other devices by exchanging address, control, and data information over the system bus 408. For example, the CPU(s) 402 can communicate bus transaction requests to the memory controller 202 as an example of a slave device.

Other master and slave devices can be connected to the system bus 408. As illustrated in FIG. 4, these devices can include a memory system 410, one or more input devices 412, one or more output devices 414, one or more network interface devices 416, and one or more display controllers 418, as examples. The input device(s) 412 can include any type of input device, including but not limited to input keys, switches, voice processors, etc. The output device(s) 414 can include any type of output device, including but not limited to audio, video, other visual indicators, etc. The network interface device(s) 416 can be any devices configured to allow exchange of data to and from a network 420. The network 420 can be any type of network, including but not limited to a wired or wireless network, a private or public network, a local area network (LAN), a wide local area network (WLAN), and the Internet. The network interface device(s) 416 can be configured to support any type of communications protocol desired. The memory system 410 can include one or more memory units 422(0)-422(Z), a subset of which may comprise heterogeneous memory.

The CPU(s) 402 may also be configured to access the display controller(s) 418 over the system bus 408 to control information sent to one or more displays 424. The display controller(s) 418 sends information to the display(s) 424 to be displayed via one or more video processors 426, which process the information to be displayed into a format suitable for the display(s) 424. The display(s) 424 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The memory controller described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative memory controllers, logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, Dynamic RAM (DRAM), Synchronous DRAM (SDRAM), a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sets other than the illustrated sets. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A memory controller for providing flexible management of a heterogeneous memory system of a processor-based system, the memory controller communicatively coupled to a first memory and a second memory having different performance characteristics;

the memory controller comprising a software-configurable Quality of Service (QoS) policy table providing a plurality of QoS policy entries, each QoS policy entry comprising a QoS policy state and associated with a QoS identifier (QoSID) of one or more QoSIDs, the QoSID associated with one or more of a plurality of memory regions, wherein the plurality of memory regions reside within the first memory, the second memory, or both; and the memory controller configured to:
    receive a memory access request comprising a memory address corresponding to a memory region of the plurality of memory regions;
    identify a software-configurable QoSID associated with the memory address;
    associate, using the QoS policy table, the QoSID associated with the memory address with a QoS policy state; and
    apply the QoS policy state to perform a memory access operation on one of the first memory and the second memory.

2. The memory controller of claim 1, further configured to operate the first memory as a transparent cache for the second memory;
    wherein the plurality of memory regions comprises a plurality of memory regions of the second memory.

3. The memory controller of claim 2, configured to apply the QoS policy state to perform the memory access operation by being configured to perform one of a cache eviction from the first memory and a cache fill of the first memory based on the QoS policy state.

4. The memory controller of claim 3, configured to perform the cache eviction from the first memory based on the QoS policy state by being configured to:
randomly sample the plurality of QoSIDs corresponding to a plurality of cache lines of the first memory; and
select a cache line of the plurality of cache lines that is associated with a QoSID that is most over quota for eviction from the first memory.

5. The memory controller of claim 2, configured to identify the QoSID associated with the memory address by being configured to access a master table in the second memory, the master table comprising a plurality of master table entries each corresponding to a range of one or more memory addresses associated with a QoSID of the one or more QoSIDs.

6. The memory controller of claim 5, further configured to receive, from a software process executing on the processor-based system, an update to a master table entry of the plurality of master table entries of the master table.

7. The memory controller of claim 5, further comprising a master table cache comprising a plurality of master table cache entries each configured to cache a master table entry of the master table;
the memory controller configured to identify the QoSID associated with the memory address by being configured to, prior to accessing the master table in the second memory:
determine whether a master table cache entry of the plurality of master table cache entries of the master table cache corresponds to the memory address; and
responsive to determining that a master table cache entry of the plurality of master table cache entries corresponds to the memory address, access the master table cache entry;
wherein the memory controller is configured to access the master table in the second memory responsive to determining that a master table cache entry of the plurality of master table cache entries does not correspond to the memory address.

8. The memory controller of claim 2, configured to identify the QoSID associated with the memory address by being configured to access the QoSID stored by the first memory in association with the memory address.

9. The memory controller of claim 1, further configured to receive, from a software process executing on the processor-based system, an update to a QoS policy entry of the plurality of QoS policy entries of the QoS policy table.

10. The memory controller of claim 1, wherein a QoS policy state of each of the plurality of QoS policy entries indicates one or more of a quota, a priority, a proportional-share weight, and a probability.

11. The memory controller of claim 1, communicatively coupled to a high-bandwidth memory (HBM) as the first memory and a dynamic random access memory (DRAM) as the second memory.

12. The memory controller of claim 1 integrated into an integrated circuit (IC).

13. The memory controller of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device (e.g., a smart watch, a health or fitness tracker, eyewear, etc.); a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

14. A memory controller for providing flexible management of a heterogeneous memory system of a processor-based system, comprising:
a means for receiving a memory access request comprising a memory address corresponding to a memory region of a plurality of memory regions of one or more of a first memory and a second memory having different performance characteristics;
a means for identifying a software-configurable Quality of Service (QoS) identifier (QoSID) associated with the memory address;
a means for associating, using a software-configurable QoS policy table, the QoSID associated with the memory address with a QoS policy state; and
a means for applying the QoS policy state to perform a memory access operation on one of the first memory and the second memory.

15. A method for providing flexible management of a heterogeneous memory system of a processor-based system, comprising:
receiving, by a memory controller, a memory access request comprising a memory address corresponding to a memory region of a plurality of memory regions of one or more of a first memory and a second memory having different performance characteristics;
identifying a software-configurable Quality of Service (QoS) identifier (QoSID) of a plurality of QoSIDs, wherein the QoSID is associated with the memory address;
associating, using a software-configurable QoS policy table of the memory controller, the QoSID associated with the memory address with a QoS policy state; and
applying the QoS policy state to perform a memory access operation on one of the first memory and the second memory.

16. The method of claim 15, further comprising operating the first memory as a transparent cache for the second memory;
wherein the plurality of memory regions comprises a plurality of memory regions of the second memory.

17. The method of claim 16, wherein applying the QoS policy state to perform the memory access operation comprises performing one of a cache eviction from the first memory and a cache fill of the first memory based on the QoS policy state.

18. The method of claim 17, wherein performing the cache eviction from the first memory based on the QoS policy state comprises:
randomly sampling the plurality of QoSIDs corresponding to a plurality of cache lines of the first memory; and
selecting a cache line of the plurality of cache lines that is associated with a QoSID that is most over quota for eviction from the first memory.

19. The method of claim 16, wherein identifying the QoSID associated with the memory address comprises accessing a master table in the second memory, the master table comprising a plurality of master table entries each corresponding to a range of one or more memory addresses associated with a QoSID of the plurality of QoSIDs.

20. The method of claim 19, further comprising receiving, from a software process executing on the processor-based system, an update to a master table entry of the plurality of master table entries of the master table.

21. The method of claim 19, wherein:
the memory controller comprises a master table cache comprising a plurality of master table cache entries each configured to cache a master table entry of the master table;
identifying the QoSID associated with the memory address comprises, prior to accessing the master table in the second memory:
determining whether a master table cache entry of the plurality of master table cache entries of the master table cache corresponds to the memory address; and
responsive to determining that a master table cache entry of the plurality of master table cache entries corresponds to the memory address, accessing the master table cache entry; and
accessing the master table in the second memory is responsive to determining that a master table cache entry of the plurality of master table cache entries does not correspond to the memory address.

22. The method of claim 16, wherein identifying the QoSID associated with the memory address comprises accessing the QoSID stored by the first memory in association with the memory address.

23. The method of claim 15, further comprising receiving, from a software process executing on the processor-based system, an update to a QoS policy entry of a plurality of QoS policy entries of the QoS policy table.

24. The method of claim 15, wherein the QoS policy state indicates one or more of a quota, a priority, a proportional-share weight, and a probability.

25. The method of claim 15, wherein the first memory comprises a high-bandwidth memory (HBM) and the second memory comprises a dynamic random access memory (DRAM).

* * * * *